Oct. 13, 1953   E. DESLONGCHAMPS   2,654,959
RAKER GAUGE
Filed Aug. 26, 1952
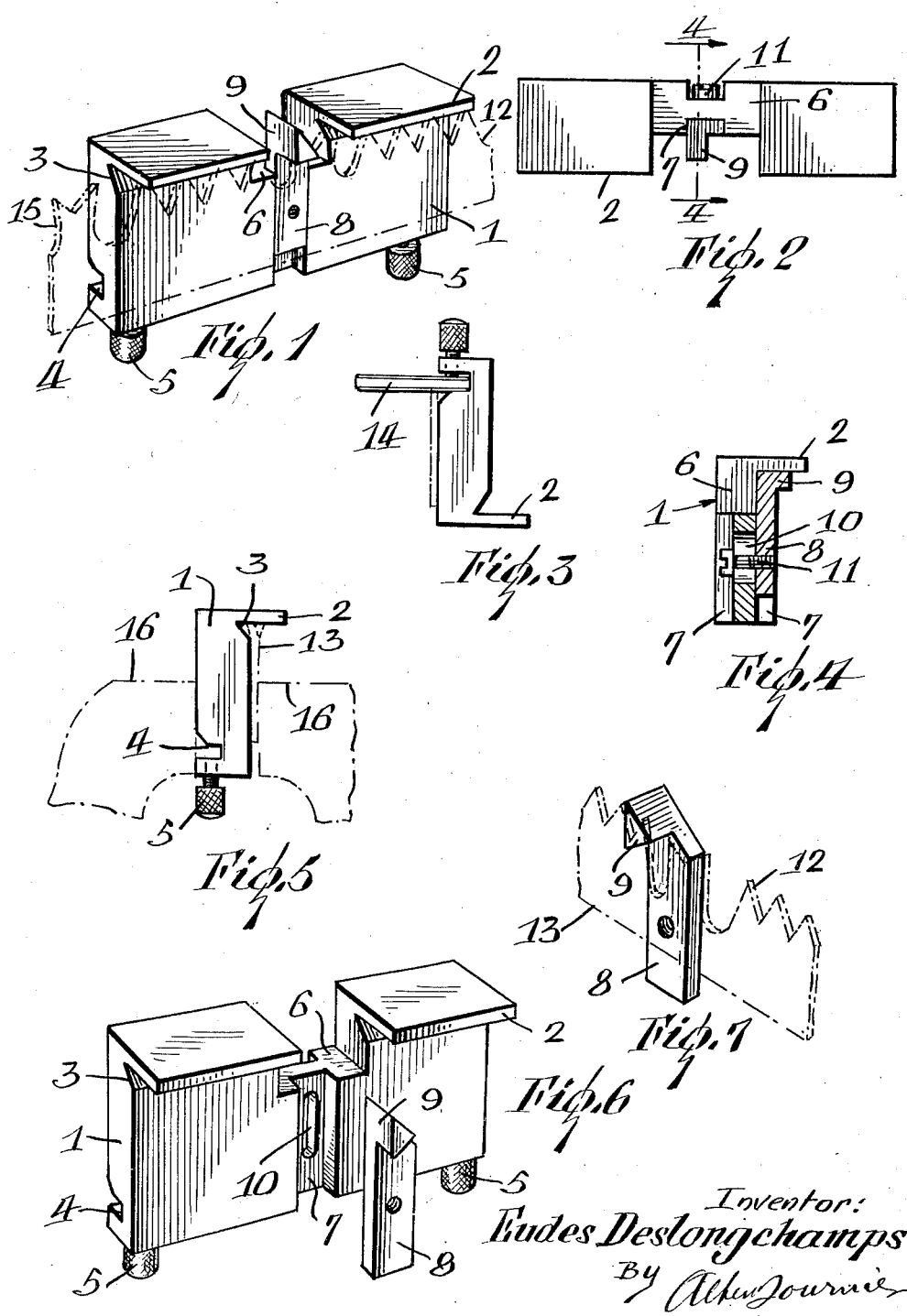
Inventor:
Eudes Deslongchamps
By Alkin Journié
Attorney Patented Oct. 13, 1953

2,654,959

UNITED STATES PATENT OFFICE 2,654,959

RAKER GAUGE

Eudes Deslongchamps, Caramat, Ontario, Canada

Application August 26, 1952, Serial No. 306,373
In Canada October 13, 1951

1 Claim. (Cl. 33—202)

The present invention pertains to a novel raker gage for sharpening especially the raking teeth of buck saws.

The principal object of the invention is to provide means for effectively guiding the file that sharpens the raker teeth occurring at regular intervals among the usual teeth of buck saws. These saws cut the wood perpendicularly to the fibers, travelling in both directions. The saw dust collects in the bottom of the saw cut, and the cutting teeth are upright and arranged in groups with a raker tooth between successive groups to clean the saw cut.

Another object of the invention is to rake the raker teeth in a uniform manner since it is the same gage that guides the file for both sides of the bevel of the raker teeth. A further object is to employ the file to regulate the alinement of the teeth before setting.

Finally, it is an object to provide a tool as described which is inexpensive, simple in construction, easy to use, and capable of being held in the jaws of a vise.

In the accomplishment of these objects, the device consists of a rectangular mounting or base having its surface extended on one side by a flange for engaging the saw teeth. This surface and flange are interrupted at the center to receive a tooth inclined to one side and forming a raker. The lower part of the tooth slides and is fixed in a vertical slide formed on each side of the mounting. Below the flange, the mounting has a triangular notch to receive the bent teeth, and on the other side of the mounting is another groove or notch to receive the edge of the file plate which is fixed therein by a screw.

The invention is fully disclosed by way of example in the following description and in the accompanying drawings in which:

Figure 1 is a perspective view of the device;

Figure 2 is a plan view;

Figure 3 is an end view;

Figure 4 is a section on the line 4—4 of Figure 2;

Figure 5 is an end view in a different position from Figure 3;

Figure 6 is another perspective view, with parts detached; and

Figure 7 is a perspective view of a detail.

Reference to these views will now be made by use of like characters which are employed to designate corresponding parts throughout.

The device includes a base or mounting 1 of rectangular shape with one edge disposed horizontally. The upper edge has a horizontal flange 2 which provides an L-shape in end view. In the angle beneath the flange is cut a triangular notch 3 for a purpose that will presently be described. On the opposite surface and near the opposite edge is a lengthwise groove 4 with parallel sides. The thickness below the groove is sufficient to receive clamping screws 5.

Midway between the ends, the surface and the flange are formed with a square notch 6, and below the notch both surfaces of the base are channelled vertically at 7 to receive a slide 8 with a tooth 9, shown in perspective in Figure 7. The tooth has a vertical side. The tooth is deeper than the channel 7 but the slide 8 is of the same depth to fit therein. The mounting has a vertical slot 10 from channel to channel for receiving slidably a screw 11 in the guide 8. By this means the tooth 9 is secured at the selected elevation.

In the use of the device, to equalize the alinement of the teeth 12 of a saw 13, an edge of a flat file 14 is set in the groove 4 and secured therein by the screws 5. The mounting with the file therein is slid over the points of the teeth to equalize them.

To sharpen the raker teeth 15, the tooth 9 is adjusted to the proper height in the V-notch of a tooth 15, so that the upper angular side of the teeth 9 is alined with one side of the V-notch, while the guide 8 is at one side of the saw blade. The saw is fixed in contact with the mounting by securing both parts in a vise 16, such that the flange 2 rests on the saw teeth; as in Figure 5. The notch 3 accommodates the lateral bend of the teeth 13 without distorting the teeth.

The said angular side of the tooth 9 guides the file as it works on the alined side of the V-notch of the saw tooth. Corresponding sides are filed in this manner on shifting the device along the saw. Thereafter the saw is reversed for filing of the remaining sides of the V-notches.

Since the same guiding surface is used for both sides of the V-notch, both sides will be at equal angles to the vertical. The horizontal thickness of the guide 9 assures adequate bearing surface for the file and an accurate movement and finish.

Although a specific embodiment of the invention has been illustrated and described, it will be understood that various alterations in the details of construction may be made without departing from the scope of the invention as indicated by the appended claim.

What I claim is:

A raker gage comprising a base, a horizontal flange at one edge thereof, said base having a vertical channel, a guide vertically adjustable therein, a tooth projecting laterally from said guide, said tooth having an inclined side adapted to aline with a saw tooth edge, whereby a file may be guided on said inclined side to work on an alined saw tooth edge bearing against the underside of said flange, and means for adjusting said guide in said channel, said body having a longitudinal groove directly beneath said flange to receive the points of laterally bent saw teeth.

EUDES DESLONGCHAMPS.

References Cited in the file of this patent

UNITED STATES PATENTS

| Number | Name | Date |
|---|---|---|
| 697,883 | Poindexter | Apr. 15, 1902 |
| 818,195 | Roach | Apr. 17, 1906 |
| 1,361,677 | Brown | Dec. 7, 1920 |